United States Patent
Naitou

(10) Patent No.: US 11,654,577 B2
(45) Date of Patent: May 23, 2023

(54) ROBOT SYSTEM

(71) Applicant: FANUC CORPORATION, Yamanashi (JP)

(72) Inventor: Yasuhiro Naitou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 410 days.

(21) Appl. No.: 16/934,393

(22) Filed: Jul. 21, 2020

(65) Prior Publication Data

US 2021/0060794 A1 Mar. 4, 2021

(30) Foreign Application Priority Data

Sep. 3, 2019 (JP) .............. JP2019-160247

(51) Int. Cl.
  *B25J 13/08* (2006.01)
  *G05B 19/401* (2006.01)
  *B25J 9/16* (2006.01)

(52) U.S. Cl.
  CPC ........... *B25J 13/085* (2013.01); *B25J 9/1694* (2013.01); *G05B 19/401* (2013.01); *G05B 2219/40599* (2013.01)

(58) Field of Classification Search
  CPC ..... B25J 13/085; B25J 9/1694; G05B 19/401; G05B 2219/40599
  See application file for complete search history.

(56) References Cited

U.S. PATENT DOCUMENTS

2015/0367510 A1   12/2015  Naitou et al.
2017/0285625 A1*  10/2017  Sato ................ B25J 9/1633

FOREIGN PATENT DOCUMENTS

| JP | 2016-007645 A | 1/2016 |
| JP | 2017-177293 A | 10/2017 |
| JP | 2018111174 A | 7/2018 |

* cited by examiner

*Primary Examiner* — Kawing Chan
(74) *Attorney, Agent, or Firm* — Maier & Maier, PLLC

(57) ABSTRACT

A robot system including a robot having one or more joints, and a control device that controls the robot, where the robot has, at at least one of the joints, a torque sensor for detecting a first torque about an axis of said joint, and has, at a position farther on a distal end side than the torque sensor, a force sensor for detecting a force. The control device determines whether or not to stop the robot on the basis of only the first torque, when the force detected by the force sensor is less than or equal to a prescribed first threshold.

5 Claims, 5 Drawing Sheets

ROBOT SYSTEM

CROSS-REFERENCE TO RELATED APPLICATIONS

This application is based on Japanese Patent Application No. 2019-160247, the contents of which are incorporated herein by reference.

FIELD

The present disclosure relates to a robot system.

BACKGROUND

There is a known technology in which a robot is disposed on a force sensor, and an external force acting on the robot is detected (for example, see Japanese Unexamined Patent Application, Publication No. 2016-7645). There is a known technology in which torque sensors for detecting torques in rotating directions of individual joints are provided, and an external force is detected in terms of torques (for example, see Japanese Unexamined Patent Application, Publication No. 2017-177293).

SUMMARY

An aspect of the present disclosure is a robot system including: a robot having one or more joints; and a control device that controls the robot, wherein the robot has, at at least one of the joints, a torque sensor for detecting a first torque about an axis of said joint, and has, at a position farther on a distal end side than the torque sensor, a force sensor for detecting a force. The control device determines whether or not to stop the robot on the basis of only the first torque, when the force detected by the force sensor is less than or equal to a prescribed first threshold.

DETAILED DESCRIPTION OF EMBODIMENTS

A robot system 1 according to a first embodiment of the present disclosure will be described below with reference to the drawings. The robot system 1 according to this embodiment is a system for performing contact stop control whereby a robot 2 is stopped by detecting contact between an external object and the robot 2. The robot system 1 is capable of performing the contact stop control not only for direct contact with the robot 2 but also for indirect contact with the robot 2 through contact with a tool S attached to the robot 2 or a workpiece. In addition to stopping the robot 2 by detecting contact, the contact stop control includes an operation similar to stopping, such as decelerating the robot 2.

Figure 1:
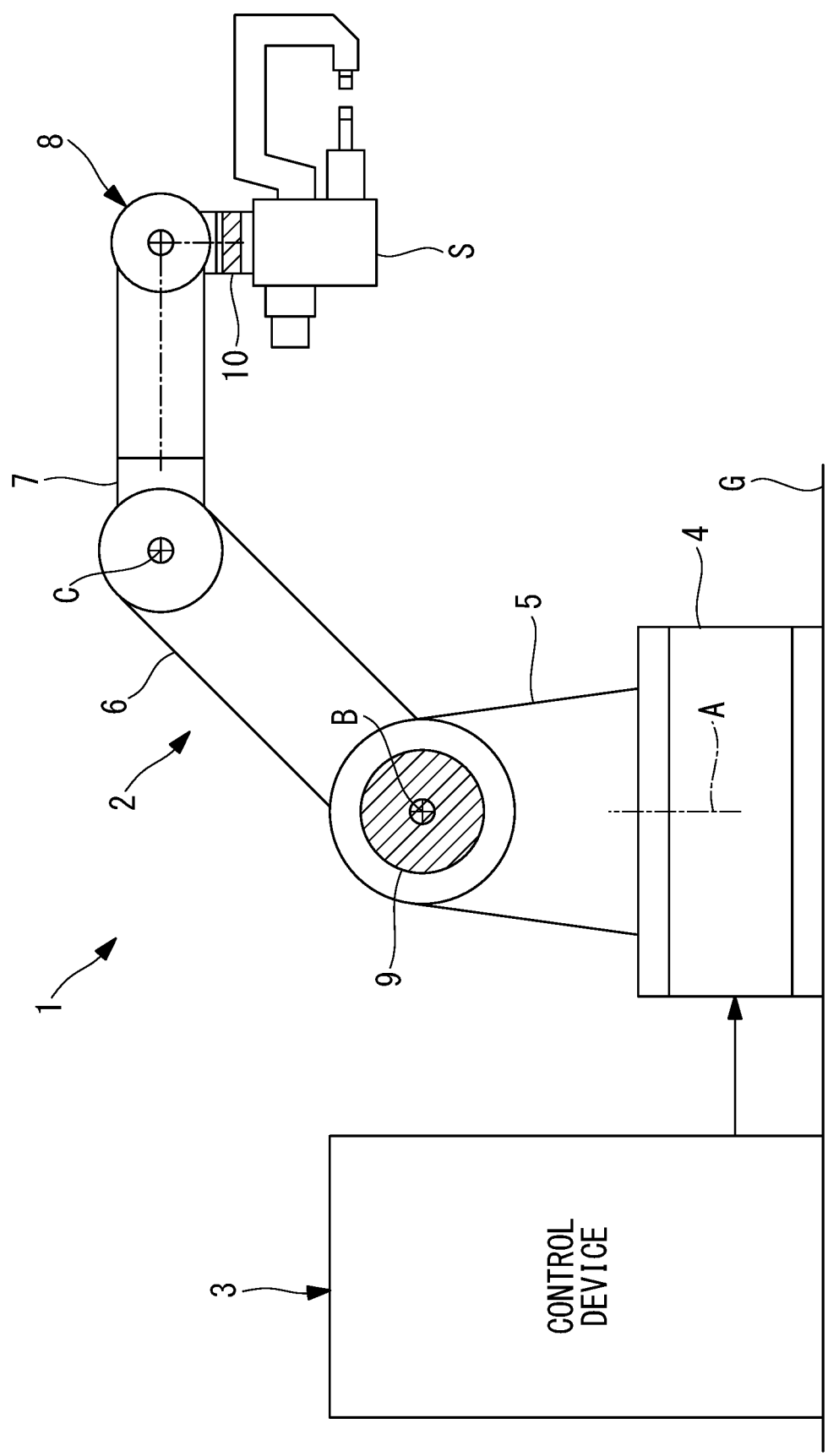
FIG. 1 is an overall configuration diagram showing a robot system according to a first embodiment of the present disclosure.

As shown in FIG. 1, the robot system 1 according to this embodiment includes the robot 2 and a control device 3 connected to the robot 2. The robot 2 is, for example, a six-axis articulated robot.

The robot 2 includes a base 4 that is fixed on a floor G, and a revolving drum 5 that is supported so as to be rotatable about a vertical first axis A with respect to the base 4. The robot 2 includes a first arm 6 that is supported so as to be pivotable about a horizontal second axis B with respect to the revolving drum 5, and a second arm 7 that is supported so as to be pivotable about a horizontal third axis C with respect to the first arm 6. The robot 2 is provided with a three-axis wrist unit 8 that is supported at the distal end of the second arm 7.

In this embodiment, the tool S, such as a hand, is fixed to the distal end of the wrist unit 8. The robot 2 includes a torque sensor 9 for detecting a torque (first torque) about the second axis (axis) B, and a force sensor 10 that is disposed between the wrist end and the tool S. The force sensor 10 is capable of detecting forces in three axial directions orthogonal to one another.

The control device 3 is constituted of a processor and a memory. The control device 3 controls the operation of the robot 2 according to a program taught in advance, and also performs the contact stop control of the robot 2 on the basis of the torque detected by the torque sensor 9 and the forces detected by the force sensor 10.

Figure 2:
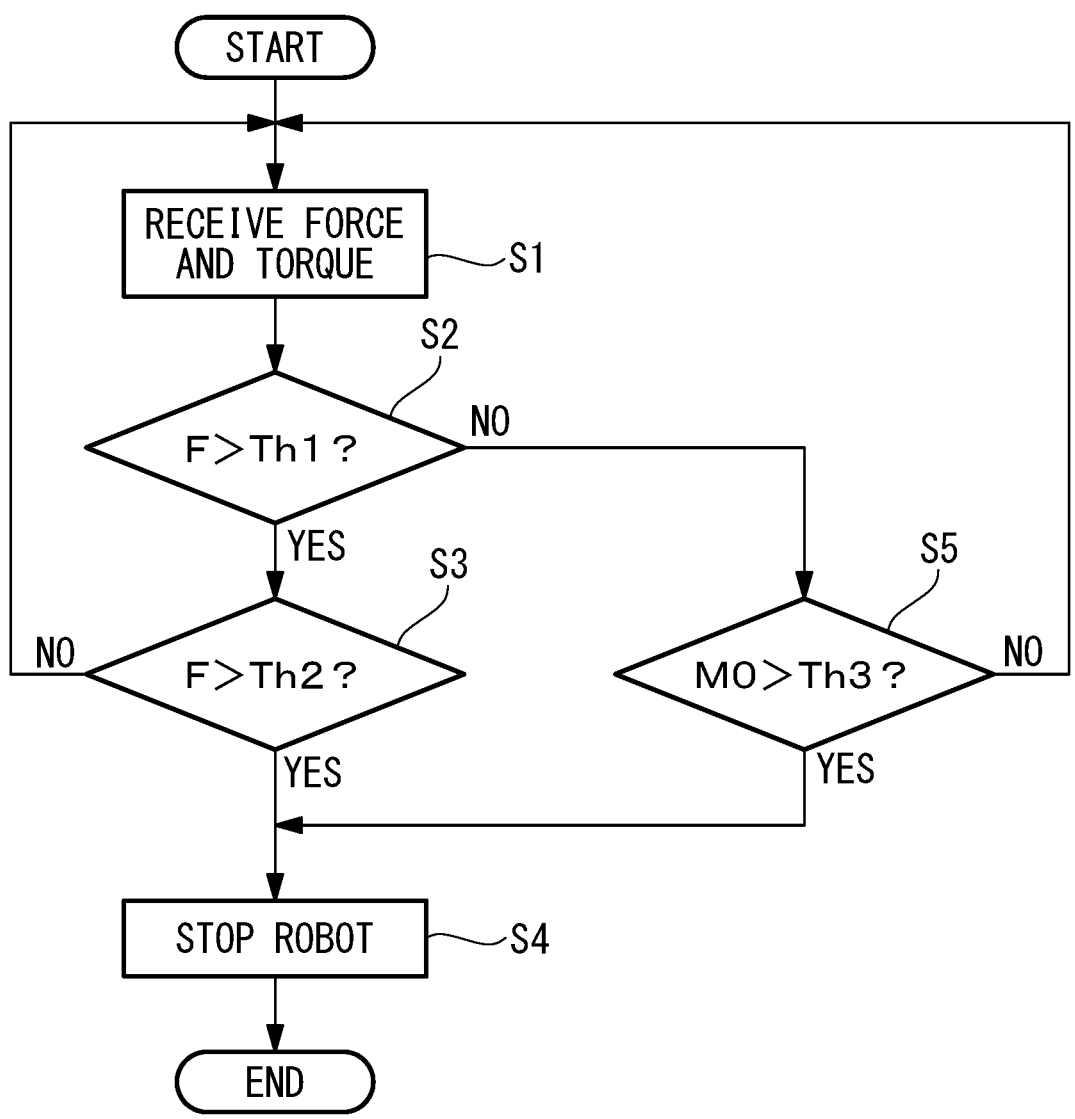
FIG. 2 is a flowchart for explaining the operation of a control device in the robot system in FIG. 1.

Specifically, as shown in FIG. 2, the control device 3 first receives the forces detected by the force sensor 10 and the torque detected by the torque sensor 9 (step S1), and determines whether or not a force F in any one direction among the forces in the three axial directions, which have been detected by the force sensor 10, is larger than a first threshold Th1 (step S2). The first threshold Th1 is set to a value that is greater than the noise level of the force sensor 10 and that is as small as possible.

If the detected force F is larger than the first threshold Th1, it is judged that the contact with an external object is occurring farther on the distal end side than the force sensor 10. Then, it is determined whether or not a force F in any one direction among the forces in the three axial directions, which have been detected by the force sensor 10, (or a resultant force of the forces in the three axial directions) is larger than a second threshold Th2 (step S3). If the force F is larger than the second threshold Th2, the robot 2 is stopped (step S4). On the other hand, if the force F is less than or equal to the second threshold Th2, the robot 2 is not stopped, and the processes from step S1 are repeated.

If the detected forces F in the three axial directions are all less than or equal to the first threshold Th1, it is judged that the contact with an external object is not occurring farther on the distal end side than the force sensor 10. In this case, it is determined whether or not a first torque M0 detected by the torque sensor 9 is larger than a third threshold Th3 (step S5). If the first torque M0 is larger than the third threshold Th3, the robot 2 is stopped (step S4). If the first torque M0 is less than or equal to the third threshold Th3, the robot 2 is not stopped, and the processes from step S1 are repeated.

In other words, with the robot system 1 according to this embodiment, when the contact with an external object is occurring farther on the distal end side than the force sensor 10, the first torque M0 detected by the torque sensor 9 is not used in the contact stop control. This is because the sensitivity of the torque sensor 9 becomes too high when the external force acts at a position away from the torque sensor 9. By doing so, in the case where the robot 2 performs work such as pressing the tool S against a work object, it is possible to prevent the occurrence of the problem that the robot 2 is stopped due to the pressing force only.

Also, in this case, the contact stop control of the robot 2 is performed on the basis of the forces detected by the force sensor 10, whereby it is possible to detect the external force acting on the robot 2 in a more accurate manner and to reliably stop the robot 2. In other words, there is an advantage in that it is possible to reliably stop the robot 2 when contact occurs, without hindering the work of the robot 2.

When the contact with an external object is occurring farther on the base end side than the force sensor 10, the forces detected by the force sensor 10 become less than or equal to the first threshold Th1; thus, it is possible to perform the contact stop control of the robot 2 in accordance with only the first torque M0 detected by the torque sensor 9. In the area up to the distal end of the wrist unit 8, the contact point with an external object is at a position relatively close to the torque sensor 9, and thus, it is possible to suppress variation in the sensitivity within a certain range.

Figure 3:
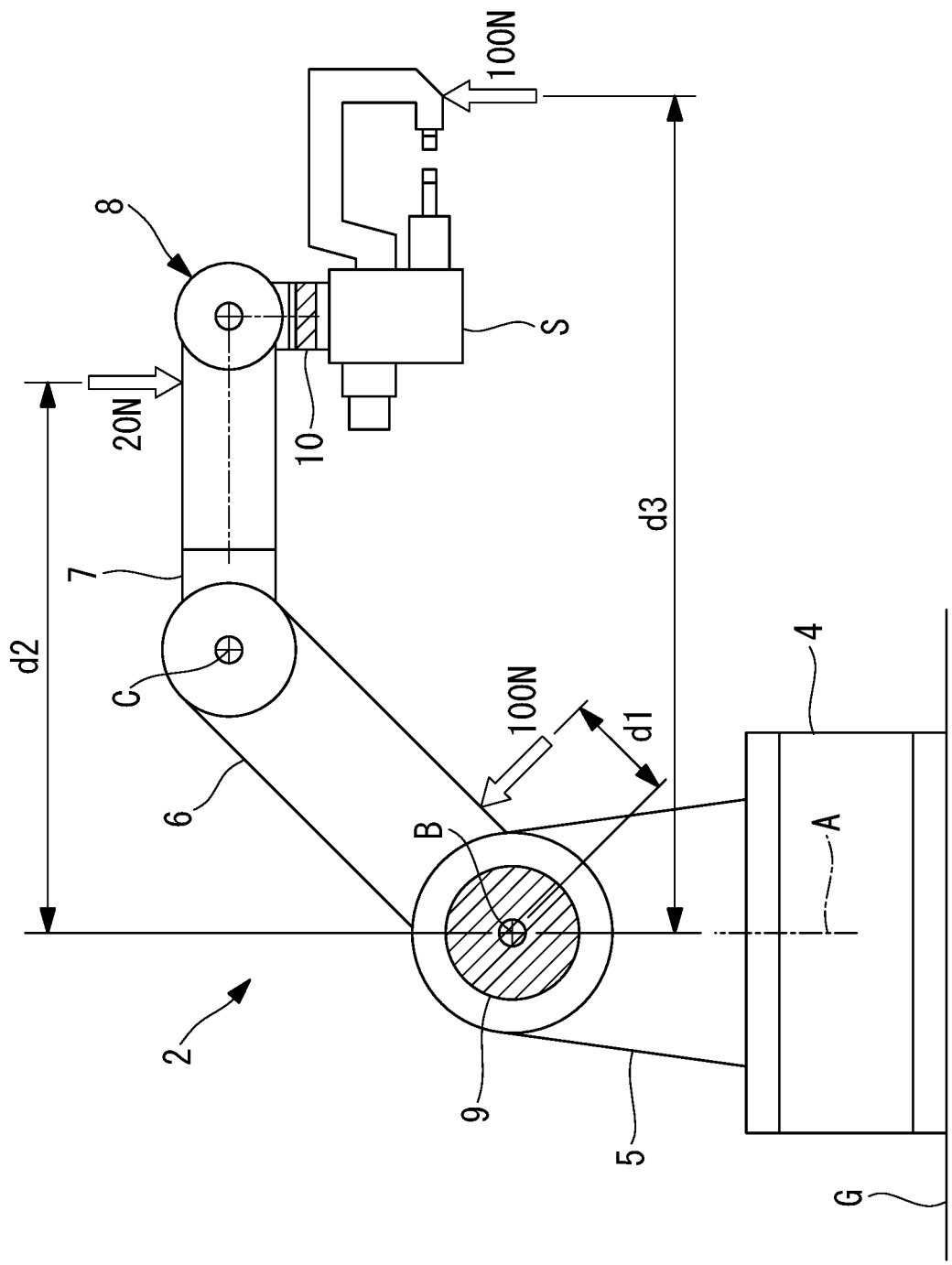
FIG. 3 is a diagram showing an example of external forces acting at individual positions of a robot in the robot system in FIG. 1.

For example, as shown in FIG. 3, in the case in which an external force of 100 N acts on the first arm 6 at a root position where a distance d1 from the second axis B is 0.2 m, a torque of 20 Nm is detected by the torque sensor 9. Therefore, if the robot 2 needs to be stopped upon detecting an external force of 100 N, the third threshold Th3 is set to 20 Nm. In this case, the robot 2 is stopped when an external force of 20 N acts on the wrist unit 8 at a position where a distance d2 from the second axis B is 1 m.

On the other hand, when the external force acts at a position farther on the distal end side than the force sensor 10, where a distance d3 from the second axis B is 2 m, the third threshold Th3 is exceeded with an external force of 10 N. With this embodiment, by setting the second threshold Th2 to 100 N, the robot 2 is not stopped even if a torque larger than 20 Nm is detected by the torque sensor 9 so long as the external force is 100 N or less.

Next, a robot system according to a second embodiment of the present disclosure will be described below with reference to the drawings. In the description of this embodiment, parts having the same configuration as those in the robot system 1 according to the abovementioned first embodiment will be assigned the same reference signs, and descriptions thereof will be omitted. The robot system according to this embodiment differs from the robot system 1 according to the first embodiment in that a force sensor 11 is disposed between the wrist end and the tool S.

Figure 4:
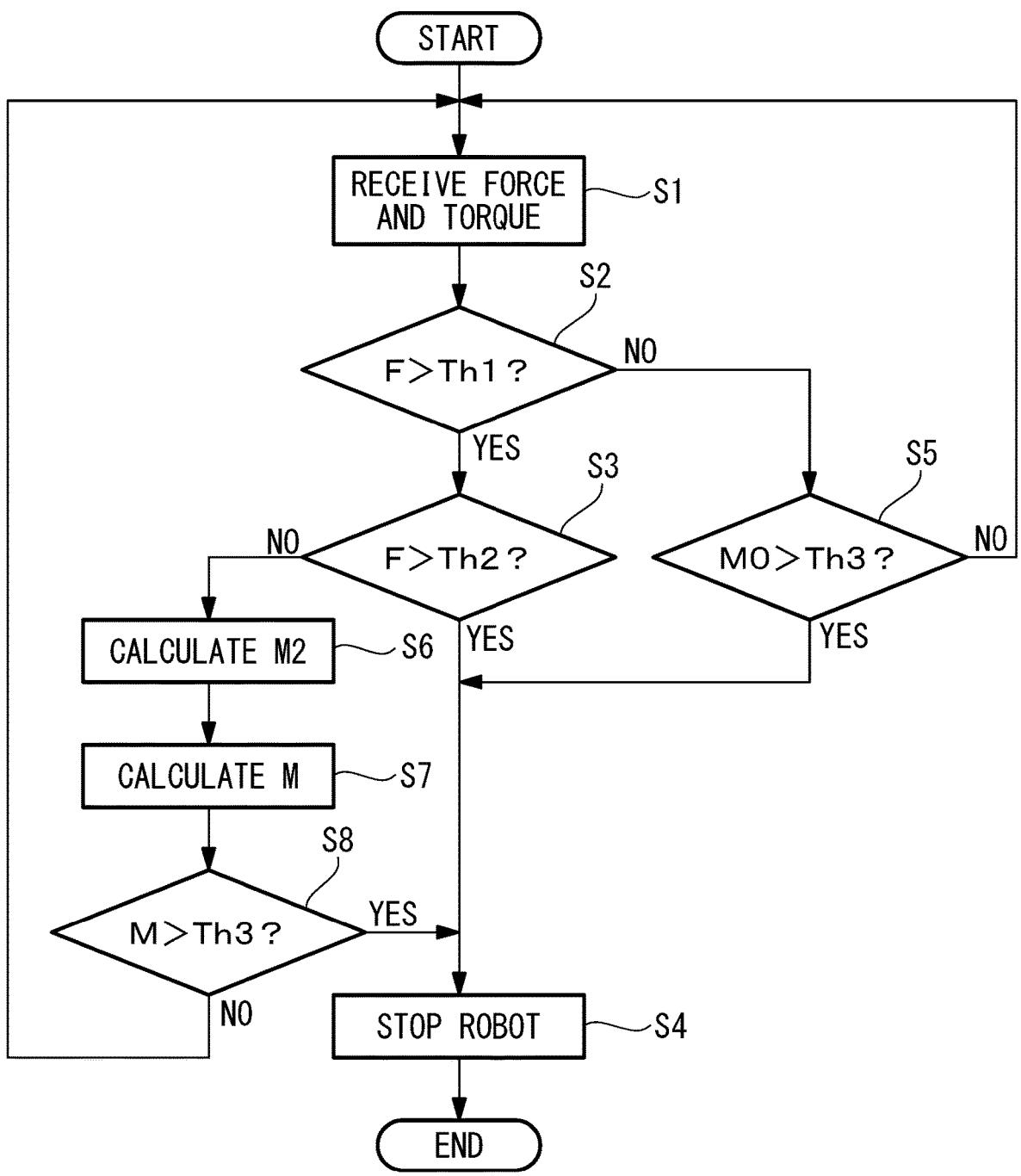
FIG. 4 is a flowchart for explaining the operation of a control device in a robot system according to a second embodiment of the present disclosure.

In this embodiment, the force sensor 11 is a six-axis force sensor capable of detecting forces F in three axial directions orthogonal to one another and torques about said three axes. In this embodiment also, as shown in FIG. 4, the forces F in the three axial directions and the torques about the three axes are detected (step S1), and it is determined whether or not the forces F in the three axial directions, which have been detected by the force sensor 11, are all larger than the first threshold Th1 (step S2).

If the forces F in the three axial directions, which have been detected by the force sensor 11, are all less than or equal to the first threshold Th1, the stop control is performed on the basis of only the torque M0 detected by the torque sensor 9 (steps S4, S5). If any one of the forces F in the three axial directions, which have been detected by the force sensor 11, is larger than the first threshold Th1, the contact with an external object is occurring farther on the distal end side than the force sensor 11. Then, it is determined whether or not any one of the forces F in the three axial directions, which have been detected by the force sensor 11, (or a resultant force of the forces in the three axial directions) is larger than the second threshold Th2 (step S3).

If any one of the forces F in the three axial directions, which have been detected by the force sensor 11, (or a resultant force of the forces in the three axial directions) is larger than the second threshold Th2, the robot 2 is stopped (step S4). On the other hand, if the forces F are less than or equal to the second threshold Th2, the control device 3 uses the forces F detected by the force sensor 11 and the torque M0 to calculate a torque (second torque) M2, which is generated at the torque sensor 9 due to the forces F acting at the position farther on the distal end side than the force sensor 11, by the following method (step S6).

Figure 5:
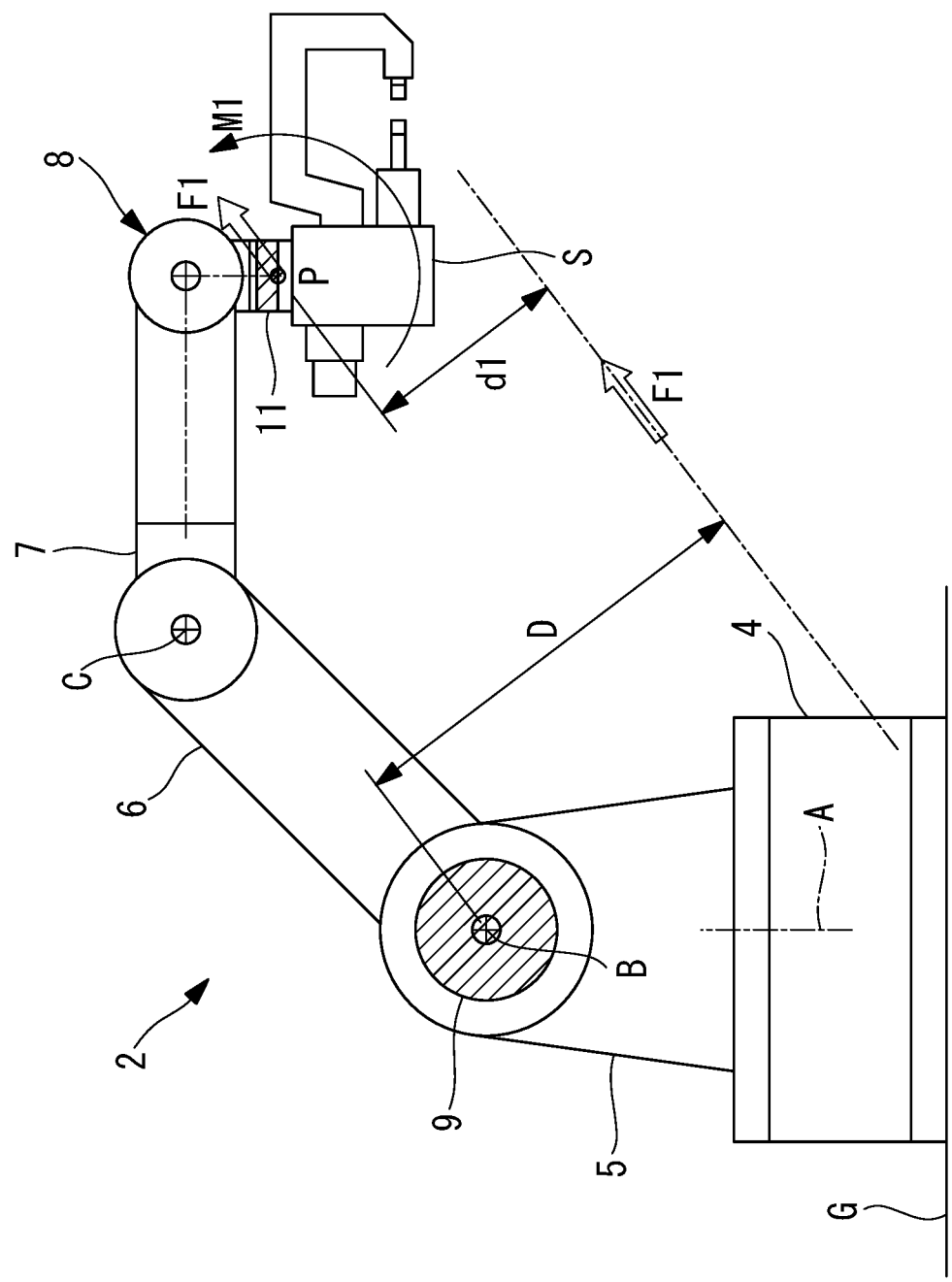
FIG. 5 is a diagram for explaining contact stop control based on a force F1 and a torque M1 acting on the distal end of the robot in the robot system in FIG. 1 and a torque M0 detected by a torque sensor.

Then, a torque (third torque) M is calculated by subtracting the torque M2 from the torque (first torque) M0 detected by the torque sensor 9 (step S7), and it is determined whether or not to stop the robot 2 depending on whether or not the obtained torque M exceeds the third threshold Th3 (step S8). The torque M2 is calculated by the following method. As shown in FIG. 5, the control device 3 first calculates a torque M1 about an axis that passes through the origin P of the force sensor 11 and that is parallel to the second axis B, and a force vector F1 along a plane orthogonal to the axis, on the basis of the forces F detected by the force sensor 11 and the torque M0.

In other words, the magnitude |F1| of the force vector F1 and the direction thereof are calculated by projecting a resultant force of the forces F in the three axial directions orthogonal to one another, which have been detected by the force sensor 11, on a plane orthogonal to the second axis B. The torque M1 about the axis that passes through the origin of the force sensor 11 and that is parallel to the second axis B is calculated on the basis of the torques about the three axes, which have been detected by the force sensor 11.

Then, a straight line along which the force vector F1 acts can be obtained by using the obtained force vector F1 and torque M1. As shown in FIG. 5, the straight line is disposed at a position where a distance d1 from the origin of the force sensor 11 is M1/|F1|. The direction of the straight line coincides with the direction of the force vector F1.

Then, the control device 3 obtains the positional relationship between the force sensor 11 and the torque sensor 9 by using a link length and a joint angle of the robot 2, and calculates a distance D between the second axis B and the straight line obtained as above. Next, the torque M2 is calculated by $$M2=|F1| \times D$$

Finally, the torque M is calculated by $$M=M0-M2$$

The control device 3 determines whether or not the calculated torque M is larger than the third threshold Th3 (step S8) and stops the robot 2 if the torque M is larger than the third threshold Th3 (step S4). If the torque M is less than or equal to the third threshold Th3, the robot 2 is not stopped, and the processes from step S1 are repeated.

In other words, in this embodiment, the torque M2, which acts on the torque sensor 9 due to the forces acting at the position farther on the distal end side than the force sensor 11, is subtracted from the torque M0, which is a detection value of the torque sensor 9. By doing so, it is possible to prevent the robot 2 from being stopped as a result of the torque sensor 9 detecting a large torque, when small forces act at the position farther on the distal end side than the force sensor 11.

In particular, with the robot system according to this embodiment, when an external force also acts at a position farther on the base end side than the force sensor 11 in a state in which an external force is acting at a position farther on the distal end side than the force sensor 11, the contact stop control of the robot 2 can be performed on the basis of the magnitude of the external force acting on the base end side. In other words, during work in which the tool S is pressed against a workpiece and the reaction force thereof acts as an external force, it is possible to continue the work by suppressing the forces detected by the force sensor 11 to a value less than or equal to the second threshold Th2. In addition, there is an advantage in that, while continuing the work, when a worker or the like comes into contact with the first arm 6 or the second arm 7 with a large force, it is possible to stop the robot 2 in a more reliable manner.

Although a case in which the torque sensor 9 for detecting the torque M0 about the second axis B is provided has been illustrated as an example in the individual embodiments described above, alternatively, the torque sensor 9 may be applied for detecting a torque about the third axis C. Torque sensors 9 may be disposed at the second axis B and the third axis C. Although a case in which the force sensor 10, 11 is disposed between the wrist unit 8 and the tool S has been illustrated as an example, alternatively, the force sensor 10, 11 may be disposed at any other position farther on the distal end side than a torque unit.

The invention claimed is:

1. A robot system, comprising:
a robot having one or more joints; and
a control device that controls the robot,
wherein the robot has, at at least one of the joints, a torque sensor for detecting a first torque about an axis of said joint, and has, at a position farther on a distal end side than the torque sensor, a force sensor for detecting a force,
the control device determines whether or not to stop the robot on a basis of only the first torque, when the force detected by the force sensor is less than or equal to a prescribed first threshold, and
the control device stops the robot on the basis of only the force detected by the force sensor, when the force detected by the force sensor is larger than the first threshold.

2. The robot system according to claim 1, wherein the control device stops the robot only if the first torque is larger than a prescribed third threshold, when the force detected by the force sensor is less than or equal to the first threshold.

3. The robot system according to claim 1, wherein the control device stops the robot only if the force detected by the force sensor is larger than a prescribed second threshold, when the force detected by the force sensor is larger than the first threshold.

4. The robot system according to claim 1, wherein the force sensor is a three-axis force sensor capable of detecting forces in three axial directions orthogonal to one another.

5. A robot system, comprising:
a robot having one or more joints; and
a control device that controls the robot,
wherein the robot has, at at least one of the joints, a torque sensor for detecting a first torque about an axis of said joint, and has, at a position farther on a distal end side than the torque sensor, a force sensor for detecting a force;
the control device determines whether or not to stop the robot on a basis of only the first torque, when the force detected by the force sensor is less than or equal to a prescribed first threshold;
the force sensor is a six-axis force sensor capable of detecting forces in three axial directions orthogonal to one another and torques about said three axes; and
the control device calculates a second torque about the aforementioned axis by using the force detected by the force sensor and the first torque, and stops the robot on the basis of a third torque obtained by subtracting the second torque from the first torque.

\* \* \* \* \*